H. Washburn,
Plow.

No. 112,302.    Patented Feb. 28. 1871.

Witnesses.
N. B. Smith
H. H. Doubleday

Inventor:
Harvy Washburn
by A. M. Smith
atty.

UNITED STATES PATENT OFFICE.

HARVY WASHBURN, OF PULTNEY, NEW YORK.

IMPROVEMENT IN PLOWS.

Specification forming part of Letters Patent No. 112,302, dated February 28, 1871.

*To all whom it may concern:*

Be it known that I, HARVY WASHBURN, of Pultney, county of Steuben, State of New York, have invented certain new and useful Improvements in Plows, of which the following is a full, clear, and exact description, reference being had to the accompanying drawings, making part of this specification, in which—

Figure 1:
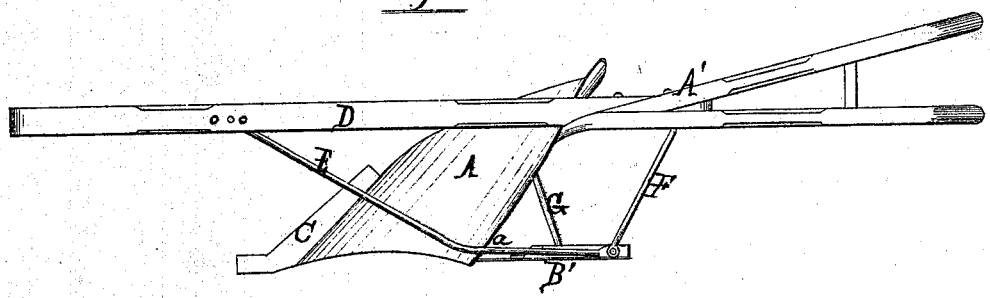
Figure 2:
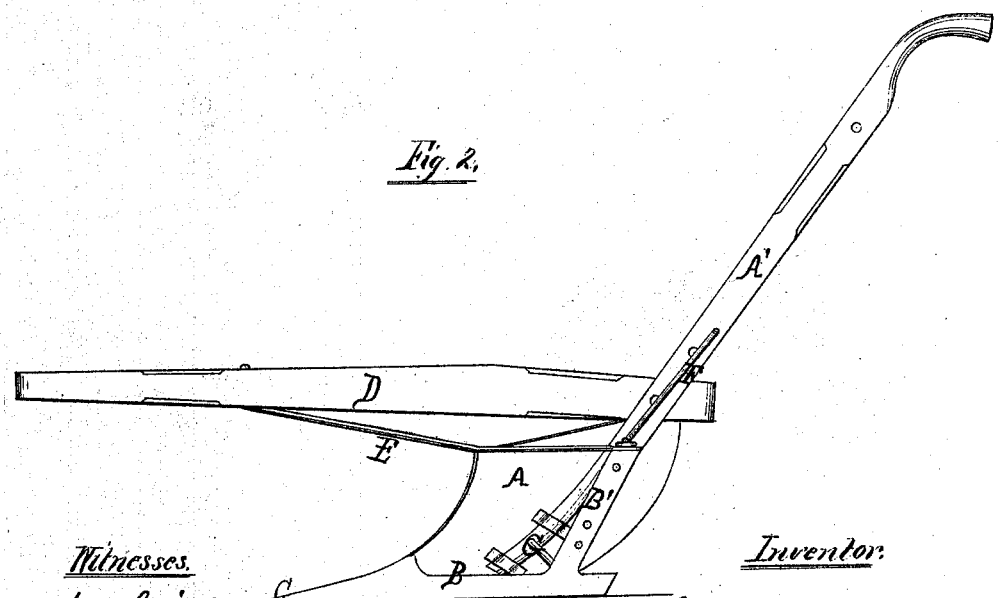

Figure 1 is a plan or top view of my improved plow, and Fig. 2 is a side elevation of the same.

Similar letters of reference denote corresponding parts in both figures.

In cultivating many kinds of crops with the plow, great difficulty has been experienced and much labor with the hoe required from the fact that the landside of the plow could not be run close enough to the corn or other plant under cultivation.

On account of the peculiar formation of the plows in general use, a furrow can be thrown toward plants; but when we come to turn a furrow from them we meet with this difficulty, that we cannot remove all of the soil that we had previously turned against them, and this is more particularly the case in working a vineyard where the grape-vines are trained upon trellises of wire stretched from post to post in such manner as to prevent cross-plowing. In this instance there is a narrow strip of land under the wires which cannot be plowed.

In order to overcome the difficulties incident to the use of the ordinary plow, as above recited, I have invented a new construction of plow, more particularly adapted for use in vineyards.

The invention consists in a novel construction and arrangement of parts, whereby a plow which will operate in the manner above indicated can be made in a very substantial and economical manner, as will be readily understood from the following description.

In the accompanying drawings, A represents the mold-board, which is provided upon its inner or under side with two or more eyes or sockets, *a*, for the reception of the handle A'.

B is the landside, and C the point, all of these parts being of any usual or desired construction.

From the heel end of the landside B rises the standard B', to which one of the handles is ordinarily attached, but which in my plow is connected with the handles and beams by a series of braces, in a manner which will presently be explained.

D is the beam, the rear end of which is firmly attached to the handle or handles A', the front end being connected with the front upper corner of the mold-board at *a*, and to standard B' through the diagonal brace-rod E. Brace-rod E should be rigidly attached to the upper end of standard B' and to the mold-board at *a*, as well as to the beam, because a proper line of draft is thereby maintained, and the plow runs steady and is easily guided. This brace is adjustably secured to the beam, so that the line of draft may be changed at the will of the operator.

F is a brace-rod connecting the standard B' with the handles, and making them mutually support each other.

G is another brace at the heel end of the landside. One end of this brace should be supported in the lower end of the handle, so that it will be tightened when it is driven in, as is done in ordinary plows.

From the above description it will be seen that the plow can be run much farther to land than other plows even of this class can be, from the fact that the beam is located nearly on the extreme outer side of the mold-board, while at the same time the arrangement of braces is such that the draft is fairly distributed between all points of the plow.

Having now described my invention, what I claim as new, and desire to secure by Letters Patent, is—

The beam D, mold-board A, landside B, standard B', and brace-rods E F, in combination with the handles A', when the handles are on a line with the beam at the heel of the mold-board, as set forth.

HARVY WASHBURN.

Witnesses:
GEORGE WAGSTAFF,
A. H. DENNISTON.